May 26, 1959 H. A. STOVER 2,888,555
ADAPTABLE INPUT CIRCUIT FOR RECEIVER PROVIDING PROPER TRACKING WITH EITHER OF TWO ANTENNAS OF DIFFERENT IMPEDANCE
Filed Feb. 27, 1958
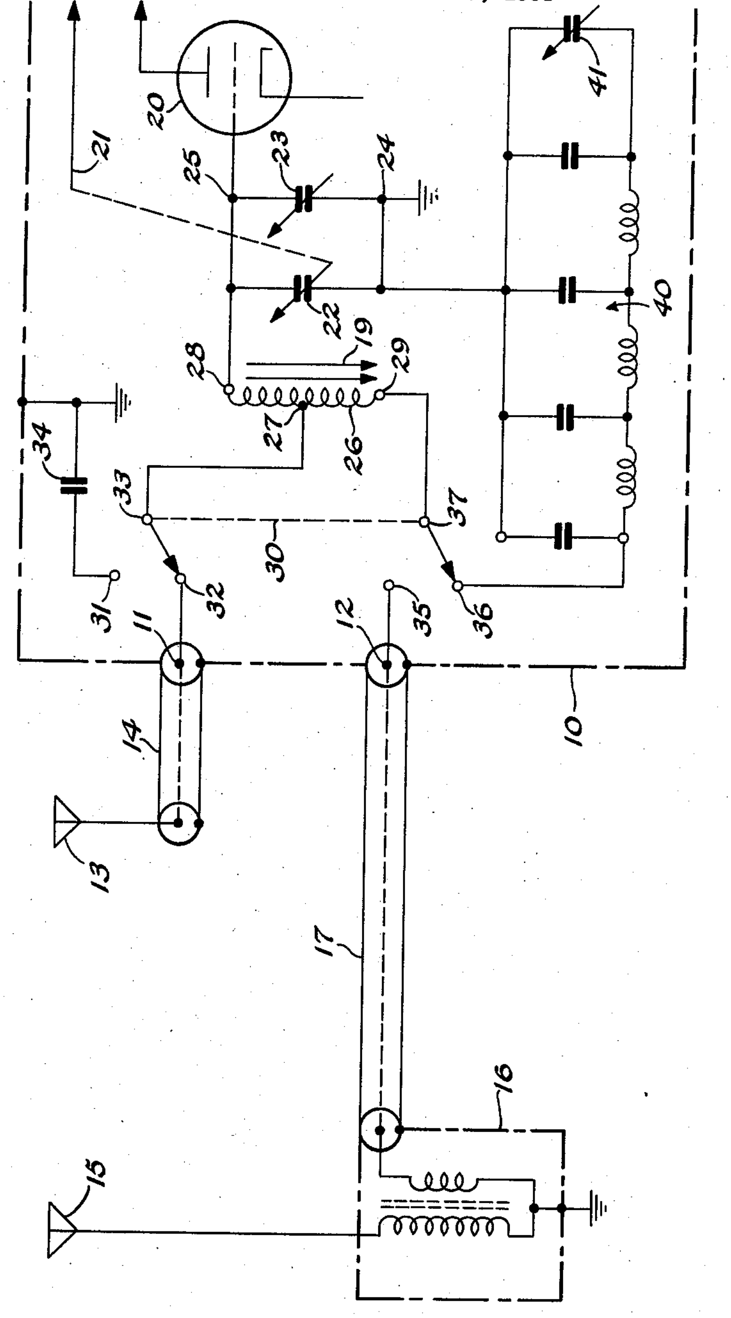
INVENTOR.
HARRIS A. STOVER
BY Marvin Moody
ATTORNEY United States Patent Office 2,888,555

Patented May 26, 1959

2,888,555

ADAPTABLE INPUT CIRCUIT FOR RECEIVER PROVIDING PROPER TRACKING WITH EITHER OF TWO ANTENNAS OF DIFFERENT IMPEDANCE

Harris A. Stover, Cedar Rapids, Iowa, assignor to Collins Radio Company, Cedar Rapids, Iowa, a corporation of Iowa Application February 27, 1958, Serial No. 717,878

3 Claims. (Cl. 250—20)

This invention relates in general to radio systems and more particularly to a coupling system combined with a tuned circuit adaptable for use in radio equipment.

In prior art systems, attempts to couple alternatively antennas of widely different characteristics or having widely different terminal characteristics at the locations of the equipment have been either complicated or unsatisfactory in operation. The problem arises where a near antenna exhibits only a few hundred micromicrofarads capacity at the terminal of the equipment and a far antenna having a long lead-in exhibits several thousand mmfds. In such instances, the equipment can be adjusted so that it tunes according to its dial or indicator for one of the antennas. It is obvious that substitution of the other antenna throws the calibration out. Other methods of coping with the problem have included the use of several tuned circuits, each related to an antenna. Another method is the use of a very low coefficient of coupling to the antenna, which unfortunately also reduces the sensitivity of the radio, and the signal-to-noise ratio.

It is an object of this invention to provide an antenna coupling system which provides substantially identical tuning characteristics regardless of substitution of another antenna.

It is a further object of this invention to provide a simple yet effective antenna coupling system which eliminates tracking errors in the tuning of the tuned circuit adjacent the antenna.

It is yet a further object of the invention to provide an antenna coupling system which makes possible simplified circuits in the equipment with resulting light weight and simplified mechanical structure.

It is a feature of the invention that a pair of antenna circuits having grossly divergent characteristics are coupled into the same tuned inductance.

It is a further feature of the invention that points on the tuned inductance are coupled alternatively to the active antenna circuit or to a local impedance having similar characteristics, thereby maintaining the inductance at a fixed known impedance.

Further objects, features, and advantages of the invention will become apparent from the following description and claims when read in conjunction with the drawings, in which:

The figure shows a schematic circuit diagram incorporating the invention.

In many instances, it is desirable to have several antennas for use with a particular radio equipment. In a specific example, an aircraft radio receiving equipment covering the range of 90 to 1800 kilocycles is used for automatic direction finding. In some aircraft types, several antennas are used over the entire frequency range. In other aircraft types, different antennas of different sizes and types are used from aircraft to aircraft with the economic need to use the same radio equipment interchangeably from aircraft to aircraft. One typical antenna installation might be an antenna mounted relatively close to the equipment and having a low effective capacity at the terminal of the equipment. For example, such an antenna might have an effective capacity of 50 mmfds. coupled to the radio equipment by a cable having approximately 220 mmfds., such as might occur when the antenna is within twenty feet of the equipment. Another typical antenna installation might be approximately 60 feet away coupled into such a long transmission line by a transformer that the entire assembly has an effective capacity of almost 3,000 mmfds. The coupling transformer provides a step-up of effective capacity because of the undesirably low capacitance of the particular antenna.

Use of the far antenna is even more complicated than use of the near antenna by the fact that such a long lead-in transmission line will exhibit resonance at about 1300 kilocycles. Thus, the effect of the capacity at the terminal of the antenna varies with increasing frequency from the near three thousand figure to a very high value of resonance, then suddenly changing to an inductive reactance above the resonance, with the inductive reactance continuing to the top of the frequency band used. It can be readily seen that mere substitution of one antenna for the other or even of merely switching to different taps on the input inductance would not avoid the resonance occurring in the long transmission line. As used in the specification and claims, the term "long transmission line" refers to the physical entity or to simulating networks exhibiting the standing waves and resonance characteristics of the long transmission line.

Since the problem arose in radio receiving equipment, this description of the invention will be couched in such terms. In the figure, a receiving equipment 10 has a pair of antenna terminals 11 and 12. A relatively near antenna 13 is coupled to terminal 11 by means of a short coupling cable 14. This antenna, at the terminal 11 exhibits primarily a substantially constant capacitive reactance throughout its useful range of frequency. A far or distantly placed antenna 15 is coupled to terminal 12 through a capacity step-up transformer 16 mounted adjacent the far antenna. A long transmission line 17 couples the capacitance step-up transformer 16 to the second antenna terminal 12. As discussed above, the long transmission line 17 is long enough to exhibit a standing wave and have variation in capacity running into inductive reactance over the frequency band in which the antenna is used.

The receiver is shown to the extent of the first amplifier 20. The coupling circuit is connected to amplifier 20. Further cooperation with the remainder of the set appears in the well-known ganging 21 of the tuning capacitor 22. Capacitor 22 is tuned concurrently with other capacitors in the equipment. A second capacitor 23 at the same point electrically is used to adjust the tracking of the ganged tuning capacitor 22; permeable slug 19 in the coil is also used in adjusting tracking.

A ganged switch 30 is connected to an inductance 26. Switch 30 has two sections; one section has two fixed contacts 31 and 32 and a moving contact 33. The moving contact 33 is coupled to a tap 27 on inductance 26. One end 28 of the inductance 26 is connected directly to the tuning capacitor 22. A resonant tuning circuit is then established upon the effective connection of the other end 29 to the ground and other side of capacitor 22. The other switch section of switch 30 has two fixed contacts 35 and 36 and a moving contact 37. The moving contact 37 is connected to the end 29 of the inductance which is to be effectively grounded.

The antenna input terminal 11 is connected to one of the fixed contacts 32 of the first switch section. The other fixed contact is connected to ground through a capacitance 34. Capacitance 34 is set or adjusted to substantially equal the capacitance seen at terminal 11 by the equipment of the antenna 13 and its lead-in 14. Moving contact 33 thus selects either the antenna 13 or the fixed capacitor 34, connecting one or the other to the fixed tap 27 of inductance 26.

In the second section of switch 30 one fixed terminal 35 is connected to the second antenna terminal 12. Moving contact 37 is connected to the end 29 of the inductor 26. The other fixed terminal 36 is connected to one terminal of a two-terminal network 40. The remaining terminal of the network 40 is connected to ground 24 completing the resonant circuit of inductance 26 and capacitors 22 and 23. Moving contact 37 thus selects either the far antenna 15 connected to terminal 12 or the two-terminal network 40. As can be seen from the effective capacitance at terminal 12 of almost 3,000 mmfds. below the resonance of line 17, inductance terminal 29 is effectively grounded relative to values of the tuning capacitance below several hundred mmfds. With this ratio of capacitances, the tuning of the circuit is relatively without error.

In order to compensate for the variation of impedance seen at terminal 12 by the equipment, network 40 must have a simulated transmission line conformation. Here the use of repeating pi sections establishes fairly easily a good approximation of the two-terminal network which can be measured at terminal 12. One or more sections are used depending on the accuracy to which the system is built. In even the most critical conditions, three sections form a reasonable substitution. Network 40 is terminated by an adjustable capacitor 41 which may be used to adjust for variations of capacity of antenna 15 discovered upon installation. Thus network 40 can be adjusted in size and length in harmony with the characteristics of line 17, and capacitor 41 is adjusted to compensate for variations introduced by the capacitance step-up transformer 16 and the antenna 15.

In operation, switch 30 is arranged to connect either the near antenna 13 to the tap 27 and the simulated long transmission line 40 as a grounding impedance to one end 29 of the inductance 26, or connect capacitance 34 to the inductance tap 27 and the far antenna 15 as a grounding impedance to the same end 29 of inductance 26.

In operation with the near antenna 13, the circuit is used as drawn. The voltage established by antenna 13 appears at terminal 11 and is connected to tap 27 through moving tap 33 of switch 30. Capacitor 22 is adjusted concurrently with other tuning capacitors in the equipment by the ganging 21 to adjust the tuning circuit of inductance 26 and the capacitors 22 and 23 to resonance. The ends of inductance 26 are connected across the tuning capacitance. One end is connected directly, whereas the other end 29 is connected through the two-terminal network 40. Although network 40 may have a variable impedance characteristic with respect to frequency, the fact that it is definitely present as determined by the switch positioned to fixed contact 36 establishes a definite circuit arrangement which can be designed for by adjusting the tracking characteristics of the tuning capacitor 22.

For use of the far-positioned antenna 15, switch 30 is moved to the other position. Tap 27 of inductance 26 is connected to ground through capacitor 34. The capacitance tapped across inductance 26 by antenna 13 is effectively unchanged thereby, avoiding a variation of the tracking characteristic of tuning capacitor 22. Simultaneously moving contact 37 connects the end 29 of inductance 26 to fixed contact 35. This connects antenna 15 into the tuned circuit as a series current source. The impedance seen at terminal 12 completes the resonant circuit as did the simulated transmission line 40. Since the impedance characteristic with respect to frequency is substantially that of the network 40, again the tuning characteristic of capacitor 22 is unchanged.

The tuned circuit is then adjusted for such frequency as desired by the ganged tuning 21. Because of the compensation made available by the coupling circuit, the tuning calibration is substantially unchanged. Thus, two different antennas are connected to separate terminals 11 and 12 and coupled into a single channel in the equipment 10 at point 25. Working models incorporating the invention exhibited quite satisfactory tracking characteristics coupled to either antenna. The tuning range was that of 90 to 1800 kilocycles.

Although this invention has been described with respect to a particular embodiment thereof, it is not to be so limited because changes and modifications may be made therein which are within the full intended scope of the invention as defined by the appended claims.

I claim:

1. An antenna coupling circuit comprising a first terminal adapted for connection to a near antenna, a second terminal adapted for connection to a distant antenna, a first capacitor having substantially the same capacitance seen by said first terminal, a lumped constant transmission line having the characteristics seen by said second terminal, a two-position switch having first and second sections, an inductance adapted for tuning, said inductance having an end terminal and a tap terminal, said first section of said switch connecting said first terminal or said capacitance to said tap in a predetermined order, said second section of said switch concurrently connecting said transmission line or said second terminal to said end terminal in said predetermined order.

2. An antenna coupling circuit comprising an inductance, said inductance being adaptable for tuning, a tap on said inductance, a switch having first and second sections, each section selecting one of two fixed contacts concurrently, a first input terminal, a capacitor, said first input terminal and said capacitor being connected to the fixed contacts of said first switch section, said first section being connected to said tap, a second input terminal, a two-terminal network simulating a long transmission line, said second input terminal and one terminal of said network being connected to the fixed contacts of said second switch section, said second switch section being connected to an end of said inductance, whereby said first switch section connects either said first input terminal or said capacitor to said tap while said second switch section concurrently connects either said network or said second input terminal to said inductance end.

3. An antenna coupling circuit comprising a first terminal, a second terminal, a double-pole double-throw switch, a capacitor, a two-terminal network simulating a long transmission line, one end of said capacitor and one terminal of said network being grounded, an inductance having a first end, a tap and a second end, one pole of said switch connecting either said first terminal or said capacitor to said tap, the other pole of said switch concurrently connecting either the other terminal of said two-terminal network or said second terminal to said second end of said inductance, and a tuning capacitor having a predetermined tuning characteristic, said capacitor being connected between ground and said first end of said first inductance.

No references cited.